(12) United States Patent
Honza

(10) Patent No.: US 8,543,230 B2
(45) Date of Patent: Sep. 24, 2013

(54) OPTIMIZING SEEK FUNCTIONALITY IN MEDIA CONTENT

(75) Inventor: Bryan Paul Honza, Grapevine, TX (US)

(73) Assignee: Nokia Corporation, Espoo (FI)

( * ) Notice: Subject to any disclaimer, the term of this patent is extended or adjusted under 35 U.S.C. 154(b) by 1006 days.

(21) Appl. No.: 12/129,924

(22) Filed: May 30, 2008

(65) Prior Publication Data
US 2009/0299505 A1    Dec. 3, 2009

(51) Int. Cl.
*G06F 17/00* (2006.01)

(52) U.S. Cl.
USPC ............................... 700/94; 715/721

(58) Field of Classification Search
USPC ........................................ 700/94
See application file for complete search history.

(56) References Cited

U.S. PATENT DOCUMENTS

| | | | |
|---|---|---|---|
| 5,949,948 A | 9/1999 | Krause et al. | |
| 6,081,783 A | 6/2000 | Divine et al. | |
| 6,453,115 B1 | 9/2002 | Boyle | |
| 6,795,383 B1 | 9/2004 | Yamamoto et al. | |
| 6,850,691 B1 | 2/2005 | Stam et al. | |
| 6,868,225 B1 | 3/2005 | Brown et al. | |
| 7,106,944 B2 * | 9/2006 | Graan ........................... | 386/343 |
| 2004/0130975 A1 | 7/2004 | Kii et al. | |
| 2004/0249489 A1 | 12/2004 | Dick | |
| 2005/0192686 A1 | 9/2005 | Hirota et al. | |
| 2006/0188227 A1 | 8/2006 | Mizukami et al. | |
| 2007/0230921 A1 | 10/2007 | Barton et al. | |
| 2008/0276173 A1 * | 11/2008 | Li et al. ........................ | 715/716 |

FOREIGN PATENT DOCUMENTS
EP    0763946 A2    3/1997

OTHER PUBLICATIONS

International Search Report and Written Opinion for International Application No. PCT/FI2009/050385, mailed Sep. 10, 2009, 13 pages.
Jacaba, Joebert S., Audio Compression Using Modified Discrete Cosine Transform: The MP3 Coding Standard, Oct. 2001, pp. 66-71, Department of Mathematics, University of the Philippines, Diliman, Quezon City.
Extended European Search Report for application No. 09754017.3 mailed Dec. 30, 2011.
The First Office Action in CN200980120152.2 dated Apr. 23, 2012, with English Translation.
Notification of Second Office Action in CN200980120152.2 dated Jan. 16, 2013.

* cited by examiner

*Primary Examiner* — Joseph Saunders, Jr.

(74) *Attorney, Agent, or Firm* — Banner & Witcoff, Ltd.

(57) ABSTRACT

A system and method is provided for improving media playback and seek time for media files such as encoded audio data. As the media is decoded during playback, frame position information is stored in a frame table. This frame position information may be used for pause/resume functionality, and for seek operations. If a seek operation is to a position not stored in the frame table, the media data is parsed to produce frame position information that is added to the frame table until the seek location is reached. Frame table data may be stored in several different forms, including periodic intervals that may be selected based on the length of the media data, and also contemporaneous data useful for resuming from a pause command.

19 Claims, 6 Drawing Sheets

OPTIMIZING SEEK FUNCTIONALITY IN MEDIA CONTENT

FIELD OF INVENTION

The invention relates generally to media playback. More specifically, the invention provides a system and method for optimizing seek functionality for media content.

BACKGROUND

Media files, including audio files, provide a convenient and cost effective way for recording, transporting and playback of media content. Media playback ability is available in a vast array of software and devices, including personal computers, personal stereos, mobile terminals, mobile phones, PDAs (Personal Digital Assistant), etc. Such media files may be provided in many formats, including files stored on a recording medium or memory device, or streamed over a transport connection.

Standardized media file formats, including MP3 (MPEG 1 Layer III), AAC (Advanced Audio Coding), and others have helped to promote such systems. Such media files offer a reasonable compromise of data compression vs. media quality. For such files, the file content must be decoded during playback, which requires some level of data processing power in the playback system.

Many media file formats, for example MP3 audio files, parse the audio data into frames, which consist of a header section and a data payload section. With some exception, each frame is a standalone unit, and can be decoded and played separately from other frames, or in a different order. This advantage allows streaming of data as well as other operations such as cutting, looping, and other transport options.

However, the lack of inter-frame information may present difficulties for playback, especially for an ability to pause, seek backwards, and seek forwards. Further, some media formats require exact frame position to be maintained separately and located in order to continue decoding.

Further, in some portable applications such as mobile phones, playback may be manually or automatically paused for example when a ring tone is played for an incoming phone call. When this occurs, the content playback can be pre-empted and the decoder deallocated. When the content playback is resumed, it should start from the same location where it was paused. Furthermore, some mobile device architectures have deallocated decoders when paused, and a short interval between pause and resume makes any errors in resumed playback position approximations more evident, and the user experience less acceptable.

Some audio formats provide a limited frame table in the content itself along with sync words on the frame headers. An approximate position in the data can be calculated when seeking to a position, and then a sync word can be located and decoding continued. However, errors are inevitable when the content is variable bit rate (VBR) and calculations are used when seeking. MP3 VBR encoded audio may contain a frame table of 100 entries, which reduces accuracy as the content length is increased. MP3 files may have content longer than a typical 5 minute song, such as MP3 audio books and podcasts, thus making position calculations based on minimal frame table content more prone to error.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention as a prelude to the more detailed description provided below.

An exemplary embodiment of the present invention removes the need for a parser component in series with the decoder. It eliminates the additional processing required by that parser prior to decoding. Instead, an embodiment utilizes parsing in parallel with a decoding process, and collects information from the decoder component used for seeking. If seeking forward requires information that has not yet been collected, the parser component is used instead of the decoder component for collecting the information. An embodiment maintains two levels of information: a small amount of high resolution data (information maintained for only a minimal number of media frames) for pause/resume on exact frames, and an adjustable amount of information to be utilized for seeking to new playback positions.

An exemplary embodiment of the present invention includes a method comprising receiving encoded media data partitioned into frames; decoding at least a portion of the encoded media data, and outputting the decoded portion of the encoded media data; and calculating frame position information for frames within the decoded portion of the encoded media data. The method further comprises storing the calculated frame position information in a frame table; and upon receiving a command to seek to a particular location in the encoded media data, utilizing the calculated frame position information in the frame table to determine a position in the encoded media data to continue decoding the encoded media data.

If the frame table does not have calculated frame position information for a particular location in the encoded media data, an embodiment may comprise parsing a further portion of the encoded media data; calculating frame position information for frames within the parsed further portion of the encoded media data; and storing the calculated frame position information in the frame table.

According to an embodiment, the method of storing the calculated frame position information in a frame table comprises storing frame position information based on a periodic time interval. The periodic time interval may be selected based on a size value of the encoded media data. Further, the method of storing the calculated frame position information in a frame table may comprise storing a predetermined number of calculated frame positions that are substantially contemporaneous with a present decoding position in the encoded media data.

An embodiment comprises a computer-readable medium, including computer readable instructions, that when provided to a processor cause the processor to perform any of the methods described above or below. Another embodiment comprises a processor and a memory including executable instructions, that, when provided to the processor cause the processor to perform any of the methods described above or below.

An exemplary embodiment includes an apparatus comprising a decoder, configured to decode encoded media data, the encoded media data partitioned into frames, wherein the decoder calculates frame position information for frames in the encoded media data while decoding and outputting the encoded media data; and a frame table memory, configured to receive and store the calculated frame position information from the decoder; wherein upon receiving a command to seek to a particular location in the encoded media data, the frame table memory provides position information associated with the particular location in the encoded media data. This embodiment may also comprise a parser, wherein if the frame table can not provide position information for a particular location in the encoded media data, the parser is configured to parse a further portion of the encoded media data, to calculate frame position information for frames within the parsed further portion of the encoded media data, and to provide the calculated frame position information to the frame table memory.

The frame table memory may be configured to store a predetermined number of calculated frame positions that are substantially contemporaneous with a present decoding position in the encoded media data. Further, the frame table memory may be configured to store the calculated frame position information based on a periodic time interval, which may be selected based on a size value of the encoded media data.

Another exemplary embodiment includes an apparatus comprising decoding means for encoded media data partitioned into frames, and for calculating frame position information for frames in the encoded media data while decoding, and for outputting the encoded media data; and memory means, for storing the calculated frame position information in a frame table, and for, upon receiving a command to seek to a particular location in the encoded media data, providing position information associated with the particular location in the encoded media data. The exemplary embodiment may also comprise parsing means, for wherein if the memory means can not provide position information for a particular location in the encoded media data, parsing a further portion of the encoded media data, and for calculating frame position information for frames within the parsed further portion of the encoded media data.

For any embodiment, the encoded media data may comprise variable bit rate encoded audio data.

Advantages of some embodiments of this invention include decreased CPU cycles required for audio playback, removal of peaks in CPU utilization during playback created by parsing components, and providing exact positioning for the case of pause and resume even when the decoder and other components may be deallocated. Another advantage of some embodiments of the present invention include reduced and/or optimized memory utilization, especially when the media content may be relatively long.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various exemplary embodiments, reference is made to the accompanying drawings, which form a part hereof, and in which is shown by way of illustration various exemplary embodiments in which the invention may be practiced. It is to be understood that other embodiments may be utilized and structural and functional modifications may be made without departing from the scope of the present invention.

Figure 1:
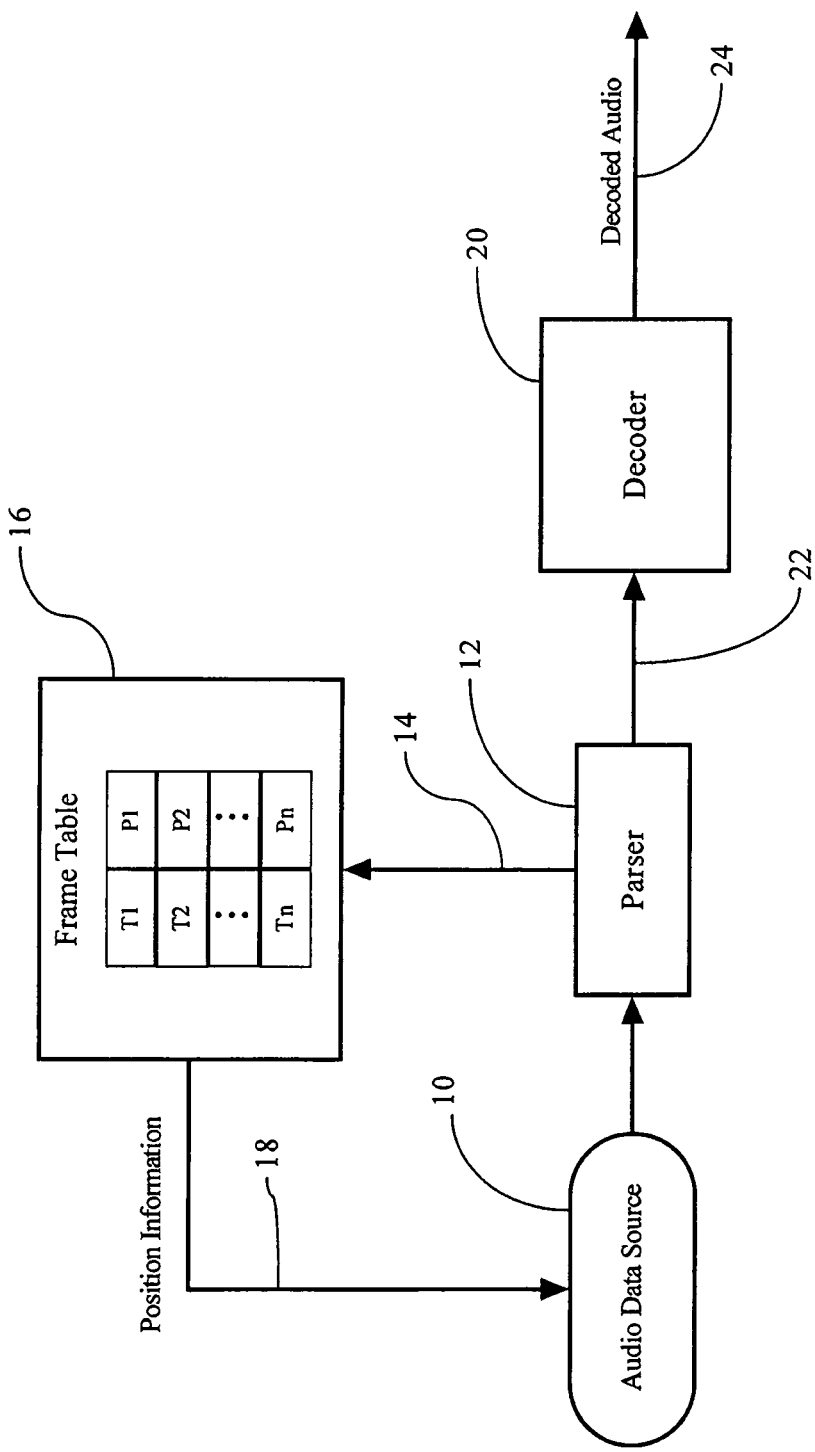
FIG. 1 illustrates a media playback system according to the prior art.

FIG. 1 illustrates a typical prior architecture for decoding such files for playback. A parser component 12 processes a media file, in this example a source of audio data 10. This audio data 10 may be a file, buffer, cache, or any combination thereof. The parser component 12 collects information that may be used to "index" the audio data 10, to allow seeking within the data file (or buffer). Typically the parser component 12 locates the start of frames within the media, and notes the frame positions, that may then be used for seeking. This frame position information 14 is typically stored in a frame table 16, that may then be used to seek 18 to locations within the audio data 10. Once the parser component 12 has processed the audio data 10, the decoder 20 begins decoding the audio data (possibly stored in a buffer 22), and produce decoded audio 24 for a listener.

If a request to seek (forwards or backwards) or to pause is received, the frame table 16 may be utilized to locate frame positions 18 within the audio data 10, whereupon information from the correct position within the audio data 10 will then be provided to the decoder 20, and audio output 24 will continue.

For this prior architecture, the frame table 16, information may be collected for every media frame, which may require a relatively large amount of memory, especially for mobile devices. This process can also cause a noticeable delay in the commencement of media playback. Further it also requires significant processing power, that, while short-lived, can deprive other applications of processing power for their activities. Larger media files will require more processing, and also more memory requirements for seek information. Maintaining this information for long content can utilize a relatively large amount of memory in mobile devices.

Figure 2:
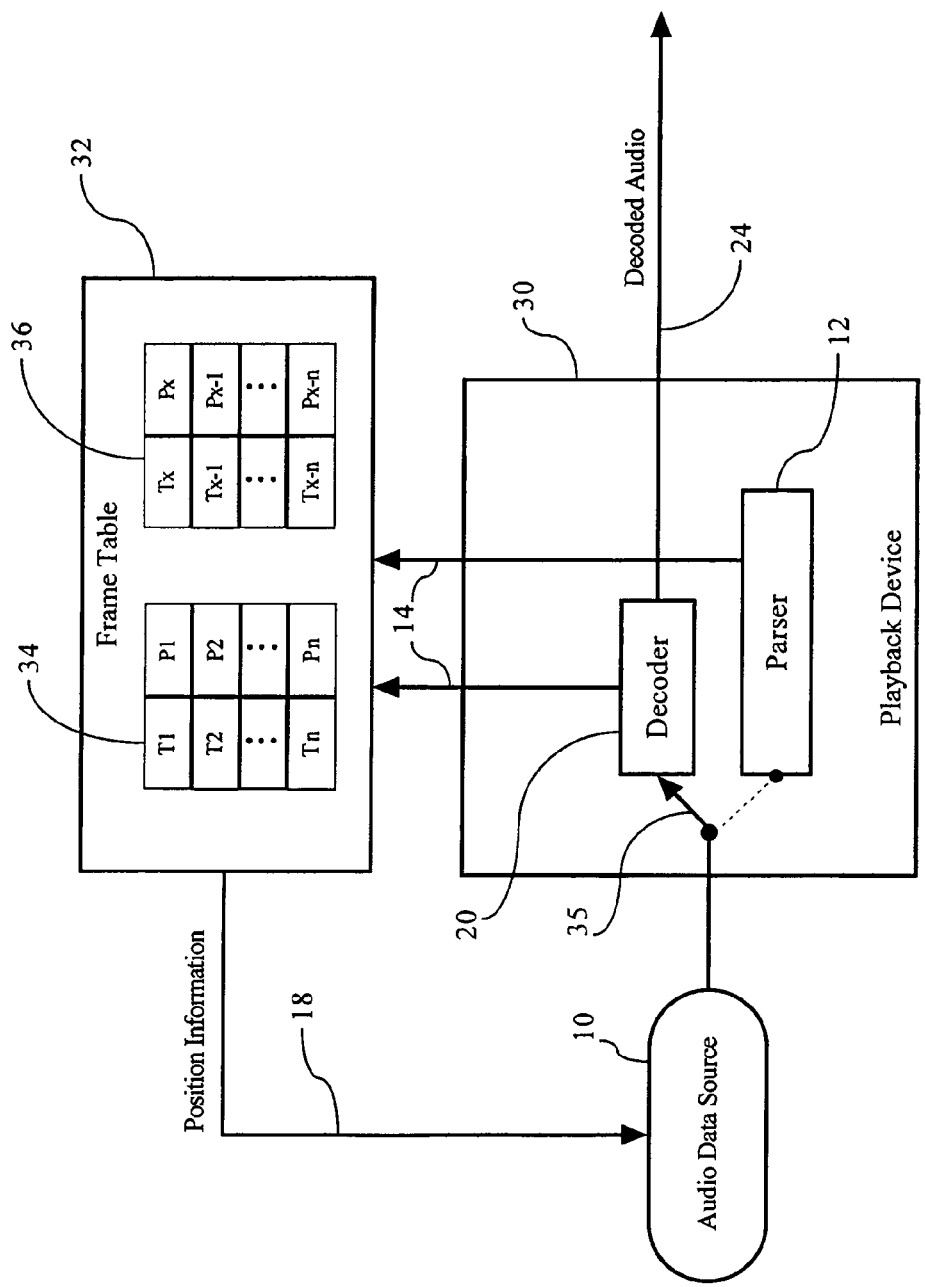
FIG. 2 illustrates a media playback system according to an exemplary embodiment of the present invention.

FIG. 2 illustrates an exemplary embodiment of the present invention. A playback device 30 may comprise a parser 12 and a decoder 20, however this embodiment does not require the parser 12 to perform parsing prior to decoding. Instead, frame information 14 is gathered as the content is being decoded by the decoder 20 during playback. Obtaining the frame information 14 in this manner requires little to no extra processing power, and avoids a delay at the beginning of playback caused by the parser parsing the audio data 10. Seeking is straightforward for frame positions that are available in the frame table 32. If frame location information has not been saved yet, such as when seeking forward, the exemplary embodiment switches from decoding by the decoder 20 to just parsing 12 (as shown by arrow 35) until the seek position is reached, with the parser 12 saving the frame location information 14 as it is parsing.

In this exemplary embodiment, two parameters may be saved for each entry in the frame table 32. The first parameter is a position value and the second parameter is a frame count. The position value is an unsigned integer representing a byte position in the audio content 10. The first entry (zeroth position) indicates the position of the first data frame. This allows the subsequent entries to be related to time zero, which is the beginning of the audio playback. This first position will be after any metadata or header information in the audio data that most likely is not needed by the decoder 20. Metadata might possibly be edited by the user or modified by the system, however if the first entry is the first audio frame, such modifications should not affect the frame table entries. If such modifications might affect the entries, an exemplary embodiment may update entries as needed. The information 14 provided by the decoder 20 and parser 12 are individual frame positions. The positions are calculated by accumulating frame length values obtained from the frame during decoding or parsing. The frame table 32 saves the positions incremented by an offset in order to maintain absolute positions. The frame table 32 may include an interface (not shown) to indicate this offset location.

When a seek is performed to a new position, the frame table 32 calculates and provides an offset to the new position, the offset being from the first frame position. The decoder 20, providing positions to the frame table, may not know the new seek position, and its position value will be reset to 0. This is not a problem because the frame table 32 maintains the offset which is provided by the user of the decoder when commanding the seek. Alternatively, an exemplary embodiment may provide the decoder 20 with the new position and the decoder 20 will adjust its position value accordingly.

The second parameter is a frame count number as an unsigned integer. This frame count may be used to calculate time in milliseconds corresponding to the position value. When a time value is needed, it is calculated from frame number and frame time. Even though frame bitrates may change, the frame time stays constant. The frame table 32 is configured with the frame time at the beginning of playback. Further details of this process will be provided below.

An exemplary embodiment of the present invention comprises memory utilization improvements based on what information is saved in the frame table 32. The frame location information 14 may be saved in two ways. An exemplary embodiment may use one or both the following techniques.

First an adjustable amount of frame information may be saved for the total content, such as in a table 34. Typically this will be frame information at periodic time intervals. The time interval may be fixed, or alternatively determined based on the audio data 10, such as the content length. The content length may be determined a number of ways, for example for constant bit rate data, the file size minus the metadata size, divided by the bitrate will provide the content length. For variable bitrate data, an average bitrate may be determined by pre-processing some media data. As examples for intervals based on content length, for long content, data for one frame position may be saved every 5 seconds. For medium length content, a frame position may be saved every second; and for short content, data for every frame may be saved. Other factors that may be used in determining the granularity of the frame information include the coding rate of the audio data, memory limits of the device, processing power, etc.

An alternative embodiment may adjust the frame information 34 dynamically during playback of the audio data. For example, at the beginning of playback the frame table 34 may initially store frame information for a short time interval, such as every half a second. As playback continues, the frame table 34 may start using a longer time interval, such as every second. In such a case, the frame table 34 may modify the previously stored frame information by deleting every other entry, thereby causing all the frame information to be at one second intervals. The frame table memory structures may be defined to make the operation of deleting selected entry intervals and re-using the memory be quick and use minimal processing power. Further, other numbers of entries for deletion may be utilized, such as skipping one entry and deleting the next three entries.

As a second way of saving frame information, an exemplary embodiment may save frame information for every audio frame, but only for a short duration needed to facilitate pause/resume on the preferred frame. A frame table 36 for this short duration data may save very few entries, possibly just the current position. For example, if the last frame decoded is saved and is rendered (played) immediately, then a single frame would provide the necessary resume accuracy. However, in a typical case where there is buffering or other processing between the decoder 20 and rendering into an audio signal for playback, the last frame decoded would not be the next frame rendered. Therefore resuming on this last frame would cause a skip forward. Accordingly, an embodiment maintains information for every frame for a short duration. The number of frame information entries maintained may be arbitrary (for example, one minute's worth of playback), or based on an amount of potential buffering after the decoder 20. As an example, the number of entries for frame information should be greater than the number of decoded frames that are buffered after the decoder 20. The frame table 36 may be implemented as a circular buffer structure, to provide automatic reuse of the old frame entry memory location.

By utilizing one or both of these techniques, an exemplary embodiment does not waste memory by saving frame information for every frame for the total content. Preferred information is saved for supporting pause/resume in an architecture that may deallocate audio components and require a seek into the content when resuming to the exact frame that was last played or rendered.

The frame tables 34 and 36 may be internal to the device 30, wherein the device 30 may provide the seek position information to a user. Alternatively one or more frame tables 34 and 36 may be shared and available to a user or other applications. Such shared frame tables may be in a standard format expected by other applications.

Figure 3:
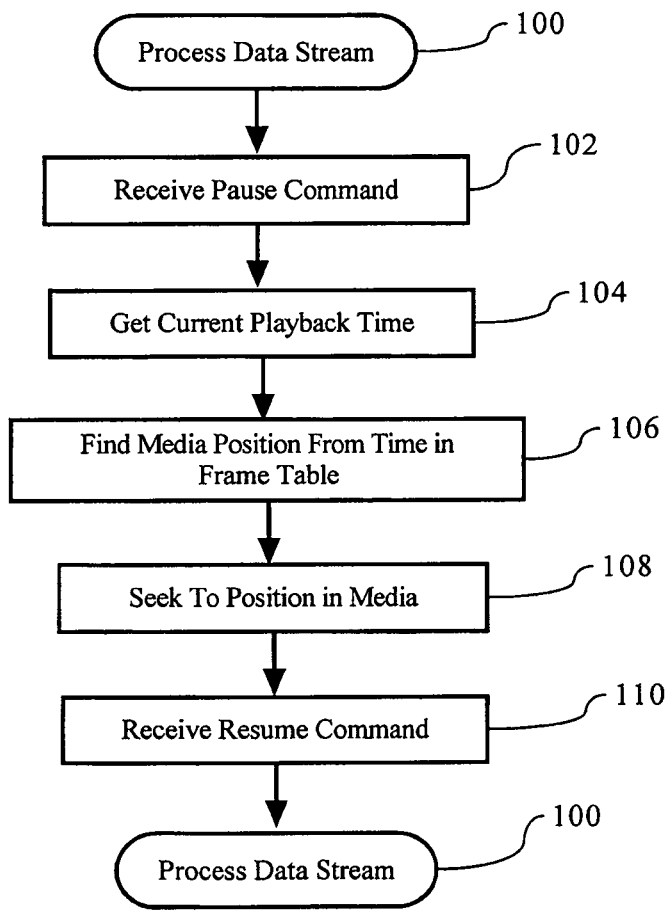
FIG. 3 illustrates a process for pausing media playback according to an exemplary embodiment.

FIG. 3 illustrates a method used by an exemplary embodiment to facilitate pausing and resuming audio or media content. This method allows the playback to be accurately resumed no matter how long the pause duration will be, and even if the decoder and other utilities are deallocated. At step 100, a decoder is processing the data stream, and providing frame position information to a frame table. Upon receiving a pause command (whether provided by a user or by another application) 102, the current playback time is noted, step 104. Using the current playback time, the proper media position in the audio file may be found in the frame table, step 106. Typically this would be using the short duration frame table 36 (FIG. 2), however another frame table may be used. The proper position in the audio data is known, step 108, so that when a resume command is received 110, then playback may continue 100 from the proper resume position in the audio data.

Figure 4:
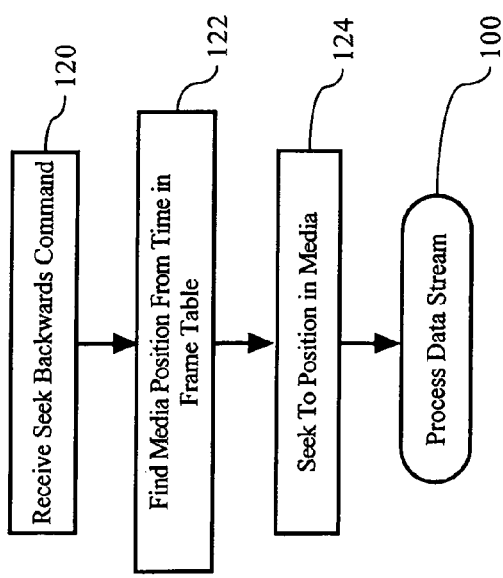
FIG. 4 illustrates a process for backwards seeking according to an exemplary embodiment.

FIG. 4 illustrates a method used by an exemplary embodiment to facilitate seeking backwards. When a seek backwards command is received, step 120, the media position based on time may be looked up in the frame table, step 122. Typically this will be a time interval table 34 (FIG. 2), however another frame table may be used. The media position information is then used to seek the proper position in the media, step 124. This process may be done once or repeated multiple times based on the seek backwards process, for example if a user is scanning backwards to find a certain point in the media. Once the proper position in the media is reached, playback may continue, step 100.

Figure 5:
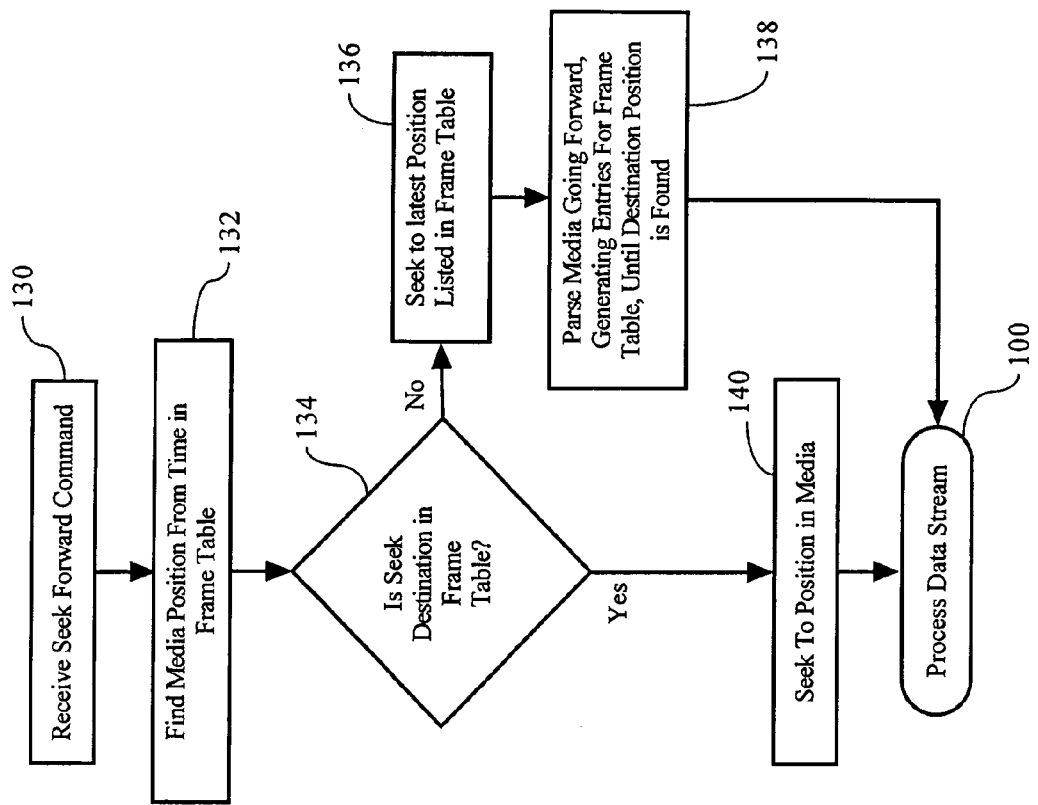
FIG. 5 illustrates a process for forward seeking according to an exemplary embodiment.

FIG. 5 illustrates a method used by an exemplary embodiment to facilitate seeking forward. Here there is the situation that frame information may not be in a frame table, because data has not yet been processed by the decoder or parser. At step 130, a command to seek forward is received. The frame table is checked to see if frame information is available for the sought time value, step 132 and 134. If the position information is available in the frame table, then the media position information is used to seek to the proper position in the media, step 140, and playback may continue (or start), step 100.

If frame information is not available for the sought time value, then the process seeks to the latest time/position value that is available in the frame table, step 136. At this point, the parser utility 12 (FIG. 2) commences parsing of the media data, and generating entries for a frame table, until the sought destination position is found, step 138. Playback processing may then continue (or start) from the destination position, step 100.

Figure 6:
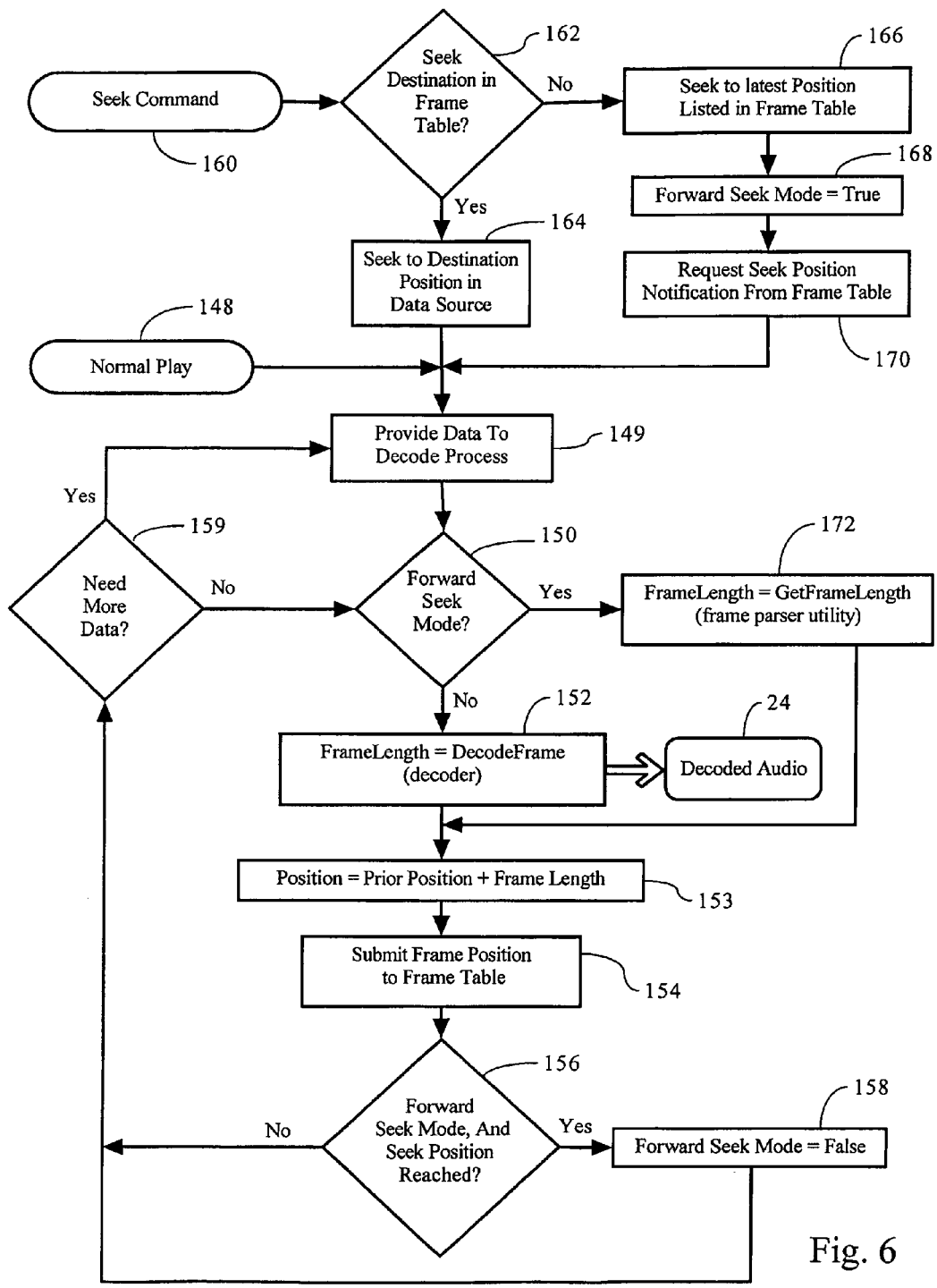
FIG. 6 illustrates details of a process for playback and forward seeking according to an exemplary embodiment.

FIG. 6 illustrates details for a method for playback processing and seeking according to an exemplary embodiment. In normal play mode 148, encoded data is provided to the decoding process, step 149. The method checks to see if it is in forward seek mode, step 150. If not, the decoder decodes audio frames, step 152 and produces decoded audio 24. As part of the decoding process 152, the frame header is decoded, which provides information on the frame length. Typically the values for the samples per frame, bit rate, sampling rate, and any padding are extracted from the frame header. The frame length in bytes may then be calculated, for example using the following formula:

$$\text{Frame Length} = ((\text{Samples Per Frame}/(8*\text{Bit rate}))/\text{Sampling Rate}) + \text{Padding Size}$$

Such calculations may be different, for example to avoid rounding error, or to take into account other factors. As an example, if the encoded data includes non-decodable (corrupt) data, if the decoder has the ability to pass over the corrupt data, the frame lengths may be adjusted accordingly to maintain proper position data. Calculating the frame length may be a standard operation for a decoder for example so the decoder may request the next decode location. In other cases, for example for AAC-ADIF (Advanced Audio Coding-Audio Data Interchange Format), determining the frame length may require parsing the actual frame element. In typical cases though, the decoder determines the frame length as a necessary step in decoding, and an exemplary embodiment of the present invention takes advantage of this to determine position information for seeking.

At step 153, position data is calculated by adding the frame length to the prior position data, and this position data is provided to the frame table, step 154. At step 156, the method checks to see if it is in forward seek mode, and also if the seek position has been reached. In the case of normal playback, this test result is false, and the method proceeds to step 159, which is to check if more encoded data is needed. In the case that there is more encoded data to process (decode), then the method continues from step 149.

If a seek command is received 160, the method checks the frame table to determine if the seeked destination position is already in the frame table, step 162. If so, then the method sets the read position in the data source to the seek position 164. Then normal playback processing may continue from step 149.

If however at step 162 it is determined that the seek destination position is not in the frame table, then the method works to parse forward and find the seek destination position. The method first sets the read position in the data source to the latest position that is available in the frame table, step 166. A forward seek mode flag is set, step 168, and the method request the frame table to provide a notification when the requested seek position is reached, step 170. The method continues with receiving encoded data, step 149. However, at step 150 the method is now in forward seek mode, so the encoded data is scanned instead by the parser utility 12 (FIG. 2). The parser utility now starts scanning the data, and calculating frame lengths, step 172. This process may be very similar to the processing done by the decoder for step 152, however the actual data of the frame is not decoded. This process may be done by the decoder process or application, with actual decoding disabled, or by a separate parser process or application, which may be optimized to allow fast frame parsing. The position data is calculated from the previous position and the frame lengths, step 153, and the position data is submitted to the frame table, step 154. At step 156, the method is in forward seek mode, but if the seek destination position has not yet been reached, the processing continues at step 159, to obtain more encoded data and parse further. If however at step 156 it is determined that the seek position has been reached, then the forward seek mode flag is disabled, step 158, and then processing continues at step 159 as normal playback mode.

For example, some embodiments of the present invention may be utilized for audio formats comprising MP3, various AAC/Enhanced AAC+ formats (e.g. ADIF (Audio Data Interchange Format) or ADTS (Audio Data Transport Stream)), AMR (Adaptive Multi Rate), AMR-WB (Adaptive Multi Rate-WideBand), and future versions and extensions of such formats. The present invention may be used with other formats (both audio, video, mixed media etc.) that do not contain suitable seek information in their containers or frames. It may also be used for seek forward in streaming media applications that do not provide seekable source providers.

As an example of the advantages provided by of an exemplary embodiment, consider that audio frame lengths are generally about 20 ms, which amounts to 50 frames per second. If frame information is saved only every 5 seconds for long content, an exemplary embodiment provides a reduction factor of 250. If the information for each frame comprises 12 bytes (an index, time, and position, each as a 32 bit integer), for a 15 minute audio file, an exemplary embodiment utilizing the dual method of frame information retention would use 2160 bytes, instead of 540,000 bytes as previously required.

Figure 7:
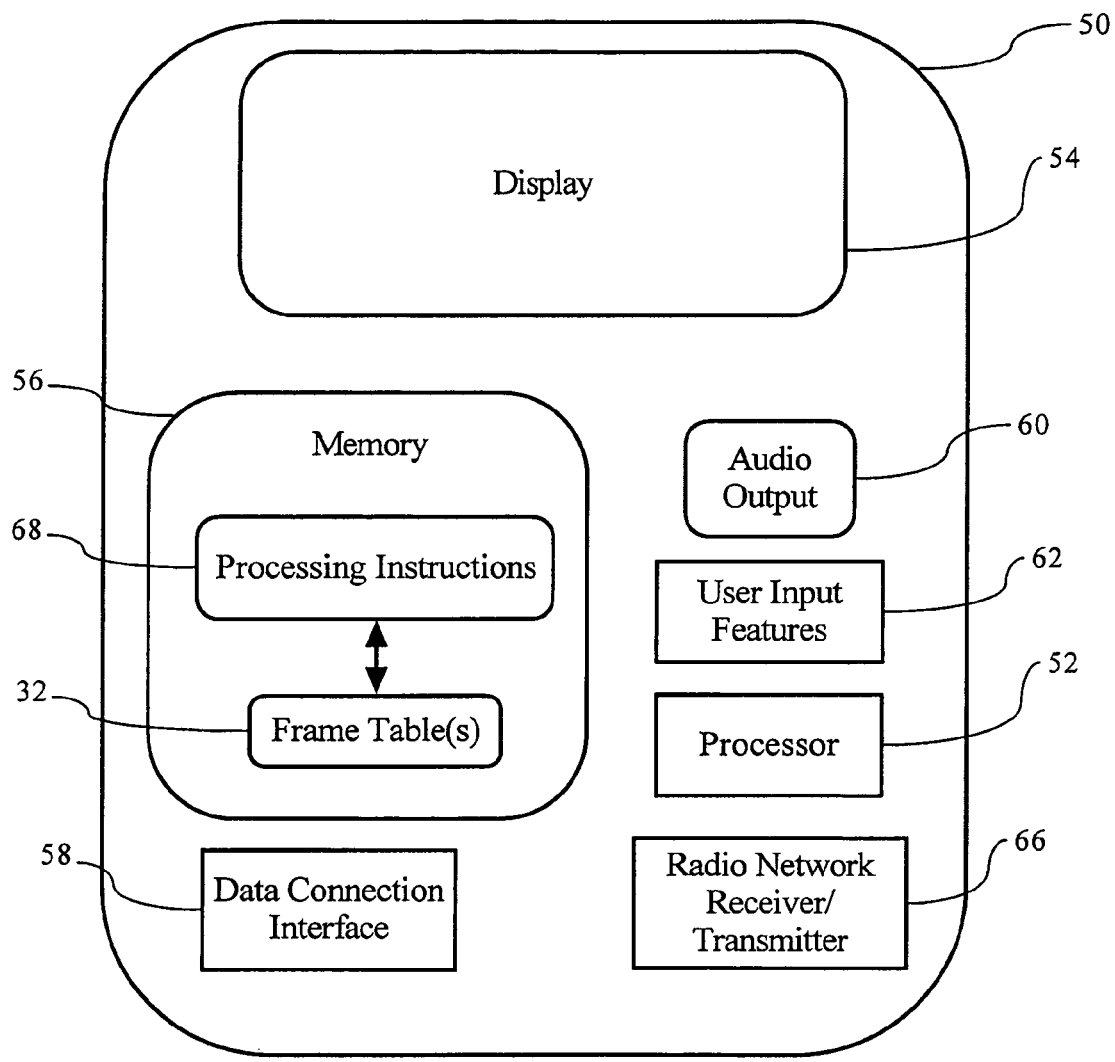
FIG. 7 illustrates a block diagram of components of a system for implementing an exemplary embodiment of the present invention.

Embodiments of the present invention may be implemented in any type of device, including computers, portable music/media players, PDAs, mobile phones, and mobile terminals. An example device comprising a mobile terminal 50 is shown in FIG. 7. The mobile terminal 50 may comprise a network-enabled wireless device, such as a cellular phone, a mobile terminal, a data terminal, a pager, a laptop computer or combinations thereof. The mobile terminal may also comprise a device that is not network-enabled, such as a personal digital assistant (PDA), a wristwatch, a GPS receiver, a portable navigation device, a car navigation device, a portable TV device, a portable video device, a portable audio device, or combinations thereof. Further, the mobile terminal may comprise any combination of network-enabled wireless devices and non network-enabled devices. Although device 50 is shown as a mobile terminal, it is understood that the invention may be practiced using non-portable or non-movable devices. As a network-enabled device, mobile terminal 50 may communicate over a radio link to a wireless network (not shown) and through gateways and web servers. Examples of wireless networks include third-generation (3G) cellular data communications networks, fourth-generation (4G) cellular data communications networks, Global System for Mobile communications networks (GSM), wireless local area networks (WLANs), or other current or future wireless communication networks. Mobile terminal 50 may also communicate with a web server through one or more ports (not shown) on the mobile terminal that may allow a wired connection to the Internet, such as universal serial bus (USB) connection, and/or via a short-range wireless connection (not shown), such as a BLUETOOTH™ link or a wireless connection to WLAN access point. Thus, mobile terminal 50 may be able to communicate with a web server in multiple ways.

As shown in FIG. 7, the mobile terminal 50 may comprise a processor 52, a display 54, memory 56, a data connection interface 58, and user input features 62, such as keypads, touch screens etc. It may also include a short-range radio transmitter/receiver 66, a global positioning system (GPS) receiver (not shown) and possibly other sensors. The processor 52 is in communication (not shown) with memory 56 and may execute instructions stored therein. The user input features 62 are also in communication with (not shown) the processor 52 for providing inputs to the processor. In combination, the user input 62, display 54 and processor 52, in concert with instructions stored in memory 56, may form a graphical user interface (GUI), which allows a user to interact with the device and modify displays shown on display 54. Data connection interface 58 is connected (not shown) with the processor 52 and enables communication with wireless networks as previously described.

The mobile terminal 50 may also comprise audio output features 60, which allows sound and music to be played. Such audio output features may include hardware features such as single and multi-channel analog amplifier circuits, equalization circuits, speakers, and audio output jacks. Such audio output features may also include digital/analog converters and filtering circuits. Other components, such as audio and media decompressors and decoders may be implemented as hardware devices, or as software instructions to be performed by the processor 52 or any combination thereof.

In accordance with processing instructions 68 in memory 56, the processor 52 may perform methods for building and utilizing frame tables 32 in accordance with an embodiment of the present invention. Memory 56 may include audio data, which may be downloaded or streamed from a network or other source. Such audio data may be stored in memory 56, or other longer term memory for example flash memory or hard disk storage.

The memory 56 may include processing instructions 68 for performing embodiments of the present invention. For example such instructions 68 may cause the processor 52 to perform a decoding process and store frame table information 32, as previously described and shown. The memory 56 may also include instructions and data storage for multiple application processes, which may also be able to access the frame table information 32. Applications and data may be swapped out of such memory when idle or pre-empted, to allow other applications to utilize such memory. Such processing instructions may be stored in different types of memory, and may be downloaded or updated through an available network.

Additionally, the methods and features recited herein may further be implemented through any number of computer readable mediums that are able to store computer readable instructions. Examples of computer readable media that may be used comprise RAM, ROM, EEPROM, flash memory or other memory technology, CD-ROM, DVD or other optical disk storage, magnetic cassettes, magnetic tape, magnetic storage and the like.

One or more aspects of the invention may be embodied in computer-usable data and computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub combination with elements of the other embodiments. It will also be appreciated and understood that modifications may be made without departing from the true spirit and scope of the present invention. The description is thus to be regarded as illustrative instead of restrictive on the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method comprising:
 receiving encoded media data partitioned into frames;
 decoding, by a decoder module, at least a portion of the encoded media data, and outputting the decoded portion of the encoded media data;
 calculating frame position information for frames within the decoded portion of the encoded media data;
 storing the calculated frame position information in a frame table;
 upon receiving a command to seek to a particular location in the encoded media data, utilizing the calculated frame position information in the frame table to determine a position in the encoded media data to continue decoding the encoded media data,
 when the frame table does not have calculated frame position information for a particular location in the encoded media data, iteratively parsing, by a parser module, a sequentially next portion of the encoded media data until a frame position corresponding to the particular location is identified;
 calculating frame position information for frames within the parsed portion of the encoded media data; and storing the calculated frame position information for the frames within the parsed portion of the encoded media data in the frame table.

2. The method of claim 1 wherein storing the calculated frame position information in the frame table comprises storing frame position information based on a periodic time interval.

3. The method of claim 2 wherein the periodic time interval is selected based on a size value of the encoded media data.

4. The method of claim 1 wherein storing the calculated frame position information in a frame table comprises storing a predetermined number of calculated frame positions that are substantially contemporaneous with a present decoding position in the encoded media data.

5. The method of claim 1 wherein the encoded media data is variable bit rate encoded audio data.

6. An apparatus comprising:
a decoder, configured to decode encoded media data, the encoded media data partitioned into frames, wherein the decoder calculates frame position information for frames in the encoded media data while decoding and outputting the encoded media data;
a frame table memory, configured to receive and store the calculated frame position information from the decoder, wherein upon receiving a command to seek to a particular location in the encoded media data, the frame table memory provides position information associated with the particular location in the encoded media data; and
a parser, wherein when the frame table can not provide position information for a particular location in the encoded media data, the parser is configured to iteratively parse a sequentially next portion of the encoded media data until the particular location is parsed, to calculate frame position information for frames within the parsed portion of the encoded media data, and to provide the calculated frame position information to the frame table memory.

7. The apparatus of claim 6 wherein the frame table memory is configured to store the calculated frame position information based on a periodic time interval.

8. The apparatus of claim 7 wherein the periodic time interval is selected based on a size value of the encoded media data.

9. The apparatus of claim 6 wherein the frame table memory is configured to store a predetermined number of calculated frame positions that are substantially contemporaneous with a present decoding position in the encoded media data.

10. The apparatus of claim 6 wherein the encoded media data is variable bit rate encoded audio data.

11. A non-transitory computer-readable medium, comprising computer readable instructions, that when provided to a processor cause the processor to perform:
receiving encoded media data partitioned into frames;
decoding, by a decoder module, at least a portion of the encoded media data, and outputting the decoded portion of the encoded media data;
calculating frame position information for frames within the decoded portion of the encoded media data;
storing the calculated frame position information in a frame table;
upon receiving a command to seek to a particular location in the encoded media data, utilizing the calculated frame position information in the frame table to determine a position in the encoded media data to continue decoding the encoded media data,
when the frame table does not have calculated frame position information for a particular location in the encoded media data, iteratively parsing, by a parser module, a sequentially next portion of the encoded media data until the particular location is parsed;
calculating frame position information for frames within the parsed portion of the encoded media data; and
storing the calculated frame position information for frames within the parsed portion of the encoded media data in the frame table.

12. The non-transitory computer-readable medium of claim 11,
wherein storing the calculated frame position information in a frame table comprises storing frame position information based on a periodic time interval.

13. The non-transitory computer-readable medium of claim 12 wherein the periodic time interval is selected based on a size value of the encoded media data.

14. The non-transitory computer-readable medium of claim 11 wherein storing the calculated frame position information in a frame table comprises storing a predetermined number of calculated frame positions that are substantially contemporaneous with a present decoding position in the encoded media data.

15. The non-transitory computer-readable medium of claim 11 wherein the encoded media data is variable bit rate encoded audio data.

16. An apparatus comprising:
a processor; and
a memory comprising executable instructions, that, when provided to the processor cause the processor to perform:
receiving encoded media data partitioned into frames;
decoding, by a decoder module, at least a portion of the encoded media data, and outputting the decoded portion of the encoded media data;
calculating frame position information for frames within the decoded portion of the encoded media data;
storing the calculated frame position information in a frame table based on a periodic time interval; and
upon receiving a command to seek to a particular location in the encoded media data, utilizing the calculated frame position information in the frame table to determine a position in the encoded media data to continue decoding the encoded media data;
wherein when the frame table does not have calculated frame position information for a particular location in the encoded media data, iteratively parsing, by a parser modue, a sequentially next portion of the encoded media data until the particular location is parsed, calculating frame position information for frames within the parsed portion of the encoded media data; and storing the calculated frame position information in the frame table.

17. The apparatus of claim 16 wherein storing the calculated frame position information in a frame table comprises storing a predetermined number of calculated frame positions that are substantially contemporaneous with a present decoding position in the encoded media data.

18. The apparatus of claim 16 wherein the apparatus is a mobile terminal.

19. An apparatus comprising:
decoding means for encoded media data partitioned into frames, and for calculating frame position information for frames in the encoded media data while decoding, and for outputting the encoded media data;

memory means, for storing the calculated frame position information in a frame table;

and for, upon receiving a command to seek to a particular location in the encoded media data, providing position information associated with the particular location in the encoded media data; and parsing means, for wherein when the memory means can not provide position information for a particular location in the encoded media data, iteratively parsing a sequentially next portion of the encoded media data until the particular location is parsed; and for calculating frame position information for frames within the parsed portion of the encoded media data.

* * * * *

UNITED STATES PATENT AND TRADEMARK OFFICE
CERTIFICATE OF CORRECTION

PATENT NO.        : 8,543,230 B2                                      Page 1 of 1
APPLICATION NO.   : 12/129924
DATED             : September 24, 2013
INVENTOR(S)       : Bryan Paul Honza It is certified that error appears in the above-identified patent and that said Letters Patent is hereby corrected as shown below:

In the Claims

In Column 12, Claim 16, Line 52:
Please delete "parser modue," and insert --parser module,--.

Signed and Sealed this
Fourth Day of March, 2014

Michelle K. Lee
*Deputy Director of the United States Patent and Trademark Office*